Patented Sept. 29, 1931

1,825,307

UNITED STATES PATENT OFFICE

ELTON R. DARLING, OF DANVILLE, ILLINOIS, ASSIGNOR TO CORNSTALK PRODUCTS COMPANY, INC., OF DANVILLE, ILLINOIS, A CORPORATION OF DELAWARE

PROCESS OF PRODUCING MATERIAL RICH IN XYLAN

No Drawing. Application filed June 19, 1929. Serial No. 372,226.

The present invention relates to the manufacture of a product having a particularly high percentage of a pentosan known as xylan, from which, by already known steps, furfural may be produced. The invention is applicable particularly to raw materials of the nature of plants of annual growth such as are exemplified by the common stalks of Zea mays, namely, the common American cornstalk.

The cornstalk contains a comparatively large amount of pentosans, among which xylan predominates. The cornstalk also contains in addition to the xylan and cellulose fibers, a fair amount of lignin. It is the object of the present invention to isolate, in a practical and commercial manner, the xylan contained in cornstalks so that the same may be employed as a raw material for the manufacture of the various conversion products, and particularly for the production of furfural.

It has already been shown in the past that the yield of furfural from a given source of pentosan materials is more or less dependent upon the percentage of xylan present, as xylan appears to give the best yield of furfural when treated with 12% sulphuric acid followed by distillation with steam.

While xylan in its pure form is soluble in water, I have found nevertheless that in the presence of lignin it does not dissolve in water and this leads me to the belief that in the cornstalk there is some form of chemical combination between the lignin and the xylan. While xylan may be removed from cornstalks by means of dilute caustic soda solution, I have found, contrary to what might be expected, that when cornstalks are treated with dilute caustic soda solution, say of a strength of about 1% in an open tank at a temperature of not over the boiling point of water, that none of the xylan will dissolve until all of the lignin has passed into solution. I believe that I am the first to discover this phenomena. I employ it for the purposes of the present invention. It will be readily understood that as the lignin dissolves in the caustic soda this will use up the caustic soda, reducing the alkalinity of the solution to a point where it is too weak to affect the residual xylan in the cornstalk and, although xylan is soluble in water, it appears not to be soluble in an alkaline solution of lignin.

This fortunate circumstance of the selective solubility of lignin over xylan is taken advantage of in carrying out the present invention, which may be done substantially as follows: Cornstalks either freshly harvested or in bales may be employed for the process. They are preferably cut into pieces about three inches long and are than boiled for about one hour with a one percent solution of caustic soda in an open kettle. The solution is then either drained away or the material removed therefrom by any suitable mechanical means, and the material is then washed with water. It will be found that there has been a loss in weight of approximately 40%, but the remaining material upon analysis will be found to contain as much as 40% of xylan. On the basis of 100 parts of cornstalk material there will thus be produced about 60 parts of a residue containing 40% of xylan; which when calculated back to the original cornstalks used represents 24 parts of xylan. This xylan-containing material when treated with sulphuric acid for conversion into furfural yields approximately 18 parts of furfural or on the basis of the original stalks 18% of the latter. This is more than twice as great a yield of furfural as has been obtained from such raw materials by any other process.

Another use for the xylan is for the production of xylose by hydrolysis. This is accomplished by heating the xylan in water with very dilute sulphuric acid at the boiling point, whereby the xylan will take up a molecule of water and will form a 5-carbon sugar known as wood sugar or xylose. By first removing the lignin from the cornstalks to produce the above described material rich in xylan, a much lighter wood sugar is produced and the latter lends itself much more readily to de-colorization so as to yield eventually a crystal white xylose syrup. While no claim is made in the present invention for the production of either furfural or xylose, it is to be understood that any process for making furfural or xylose in which a xylan containing body is treated in accordance with the above disclosure, is to be considered as within the spirit and scope of the present invention, for which I claim:

1. The process of separating lignin from xylan when associated in a vegetable material which comprises subjecting said material to the action of a dilute solution of sodium hydroxide of such strength that when the lignin has been substantially dissolved insufficient free sodium hydroxide will remain in the solution to materially affect the residual xylan.

2. The process of separating lignin from xylan when associated in a vegetable material which comprises subjecting said material to the action of a dilute solution of sodium hydroxide at a temperature not exceeding 100° C. of a strength that when the lignin has been substantially dissolved insufficient free sodium hydroxide will remain in the solution to materially affect the residual xylan.

3. The process of separating lignin from xylan when associated in a vegetable material which comprises subjecting said material to the action of a dilute solution of sodium hydroxide at a temperature not exceeding 100° C. of a strength of substantially 1% so that when the lignin has been substantially dissolved insufficient free sodium hydroxide will remain in the solution to materially affect the residual xylan.

4. The process of producing material rich in xylan which comprises treating cornstalks with a 1% solution of sodium hydroxide at substantially the boiling point of water, whereby lignin is dissolved from said stalk and passes into solution, leaving xylan in the stalk.

5. The process of producing a material rich in xylan which comprises treating cornstalks with a boiling 1% solution of sodium hydroxide, whereby lignin is dissolved from said stalks, washing the stalks after said treatment, and drying the same.

6. In the process of converting xylan-containing materials into furfural by acid hydrolysis, that step which comprises removing lignin from said materials by means of a dilute boiling solution of caustic soda, whereby substantially all of the xylan in the raw material remains therein.

7. The process of producing a material rich in xylan which comprises the cutting of cornstalks into small pieces, the treatment thereof at the boiling point of water with a substantially 1% solution of sodium hydroxide for a period of one hour, separating the residual undissolved material from the solution and washing the same substantially free from dissolved lignin and excess sodium hydroxide.

In witness whereof, I have hereunto subscribed my name.

ELTON R. DARLING.